US012469614B1

(12) United States Patent
Wenning

(10) Patent No.: US 12,469,614 B1
(45) Date of Patent: Nov. 11, 2025

(54) COLLIMATOR ARRANGEMENT FOR AN X-RAY TUBE

(71) Applicant: Siemens Healthineers AG, Forchheim (DE)

(72) Inventor: Philipp Wenning, Pressath (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 0 days.

(21) Appl. No.: 19/199,825

(22) Filed: May 6, 2025

(30) Foreign Application Priority Data

May 7, 2024 (DE) .................... 10 2024 204 271.4

(51) Int. Cl.

| | |
|---|---|
| ***G21K 1/00*** | (2006.01) |
| ***G21K 1/04*** | (2006.01) |
| ***G21K 1/10*** | (2006.01) |

(52) U.S. Cl.
CPC ............... *G21K 1/10* (2013.01); *G21K 1/046* (2013.01)

(58) Field of Classification Search
CPC .......... A61N 5/1045; A61B 6/03; A61B 6/08; A61B 6/4035; A61B 6/4064; G21K 1/00; G21K 1/04; G21K 1/046; G21K 1/025; G21K 1/043; G21K 1/10; G21K 1/02
See application file for complete search history.

(56) References Cited

U.S. PATENT DOCUMENTS

| | | | |
|---|---|---|---|
| 2017/0273645 A1 | 9/2017 | Raupach et al. | |
| 2020/0253569 A1 * | 8/2020 | Kobayashi ............ | A61B 6/465 |

FOREIGN PATENT DOCUMENTS

| | | |
|---|---|---|
| DE | 4242835 A1 | 7/1994 |
| DE | 102016204870 A1 | 9/2017 |
| DE | 202023103001 U1 | 6/2023 |

OTHER PUBLICATIONS

German Office Action and English translation thereof for German Application No. 10 2024 204 271.4 mailed Feb. 7, 2025.

* cited by examiner

*Primary Examiner* — Don K Wong
(74) *Attorney, Agent, or Firm* — Harness, Dickey & Pierce, P.L.C.

(57) ABSTRACT

A collimator arrangement for an x-ray tube includes a diaphragm arrangement close to the focal point with a plurality of diaphragms close to the focal point and a diaphragm arrangement at a distance from the focal point with a plurality of diaphragms at a distance from the focal point. The diaphragms close to the focal point can be adjusted between a maximum opened position and a maximum closed position via a number of first drives. The diaphragms at a distance from the focal point can be adjusted between a maximum opened position and a maximum closed position via a number of second drives.

14 Claims, 3 Drawing Sheets

COLLIMATOR ARRANGEMENT FOR AN X-RAY TUBE

CROSS-REFERENCE TO RELATED APPLICATION(S)

The present application claims priority under 35 U.S.C. § 119 to German Patent Application No. 10 2024 204 271.4, filed May 7, 2024, the entire contents of which are incorporated herein by reference.

FIELD

Independent of the grammatical term usage, individuals with male, female or other gender identities are included within the term.

One or more example embodiments is based on a collimator arrangement for an x-ray tube.

RELATED ART

A collimator arrangement is generally known. With it the second drives are identical to the first drives. The first drives generally act directly on the diaphragms at a distance from the focal point and on the diaphragms close to the focal point by way of additional kinematics.

The collimator arrangement is generally arranged more or less directly downstream of the x-ray source in the beam path from the x-ray source to the x-ray detector. In particular, the collimator arrangement is arranged between the x-ray source and an examination object (often a human). The beam path from the x-ray source to the x-ray detector is limited via the diaphragm arrangements of the collimator arrangement in order only to expose the examination object to the ionizing x-ray radiation to the required extent and no more.

Depending on the specific mode of operation of the x-ray arrangement, different filter plates (generally made from copper) can also be introduced into the beam path between the diaphragm arrangement close to the focal point and the diaphragm arrangement at a distance from the focal point. The filter plates are used to harden the beam. They typically have relatively minimal thicknesses of for instance 0.1 mm, 0.2 mm and 0.3 mm. The filter plates are arranged on a rotatable element, similarly to the various lenses of a microscope, so that one of the filter plates or none of the filter plates is introduced into the beam path as necessary.

It is necessary from time to time to calibrate the x-ray detector. For instance, it may be necessary to perform the calibration of the x-ray detector once a year. A thicker filter plate is introduced into the beam path in the area of the collimator arrangement in order to calibrate the x-ray detector. This filter plate can have a thickness of 0.6 mm or 2.1 mm, for instance.

Theoretically it is conceivable also to arrange this filter plate on the rotatable element. This would however result in the rotatable element and thus also the collimator arrangement as a whole having to be embodied with a very large volume. This procedure is therefore not applied in practice. Instead, the collimator arrangement of the prior art has mounting rails in the area of the diaphragm arrangement at a distance from the focal point on the side facing away from the diaphragm arrangement close to the focal point, into which mounting rails this thicker filter plate can be manually introduced. On account of the expansion of the radiation cross-section on the path between the x-ray source and the diaphragm arrangement at a distance from the focal point, the thicker filter plate is relatively large-area and heavy.

The calibration of the x-ray detector is carried out in the prior art by a service technician. The service technician travels to the corresponding x-ray system, inserts the thicker filter plate into the mounting rails and then starts the calibration sequence.

SUMMARY

One or more example embodiments consists in creating possibilities, via which a permanent arrangement also of the thicker filter plate in the collimator arrangement is enabled, wherein it is to be possible to move the thicker filter plate easily into and out of the beam path as necessary.

BRIEF DESCRIPTION OF THE DRAWINGS

Properties, features and advantages as well as the manner in which these are achieved will be become clearer and more intelligible in conjunction with the following description of the exemplary embodiments which are explained in more detail in conjunction with the drawings. In the drawings.

DETAILED DESCRIPTION

Figure 1:
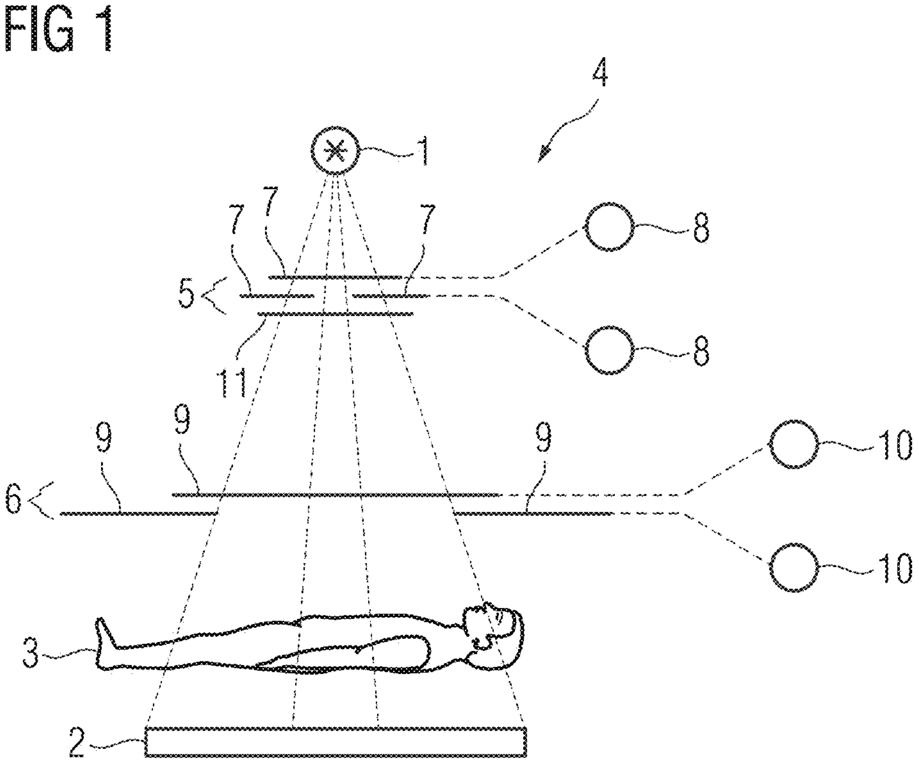
FIG. 1 shows a schematic representation of an x-ray arrangement according to one or more example embodiments.

In accordance with one or more example embodiments, a collimator arrangement of the type cited in the introduction is embodied in that

- the first drives and the second drives are drives which differ from one another and
- a filter plate can be moved over the large diaphragm opening close to the focal point via one of the first drives in the maximum opened position of the diaphragms close to the focal point.

The use of drives which differ from one another for the adjustment of the diaphragms close to and at a distance from the focal point nevertheless requires more drives than in the prior art, but in return, allows smaller and weaker drives to be used. Above all, it is possible to dispense with kinematics, which are required in the prior art, so that one and the same drives can act both on the diaphragms close to the focal point and also on the diaphragms at a distance from the focal point. The coordinated adjustment of both the diaphragms close to the focal point and also the diaphragms at a distance from the focal point can be easily achieved in that both the first and also the second drives are position-controlled. The use of one of the first drives to adjust not only the diaphragms close to the focal point but also to move the filter plate means that a separate drive is also not required to move the filter plate.

In order to adjust the diaphragms close to the focal point, it is currently preferred

- that the diaphragms close to the focal point are arranged on a first side of a baseplate, which extends parallel to a plane defined by the large diaphragm opening close to the focal point,
- that the one first drive moves an intermediate element which is likewise arranged on the first side of the baseplate,
- that a guide rail is arranged on the intermediate element, into which guide rail a first actuating pin arranged on one of the diaphragms close to the focal point engages, or conversely a first actuating pin is arranged on the intermediate element and engages into a guide rail arranged on one of the diaphragms close to the focal point,
- that the guide rail has a first section running parallel to the baseplate and a second section adjoining the first section and running at an obtuse angle with respect to the first section and
- that this diaphragm close to the focal point is then always located in the maximum opened position if the first actuating pin is located in the first section of the guide rail and is then always in the maximum closed position when the first actuating pin is located within the second section of the guide rail and is removed as far as possible from the first section of the guide rail.

Via this embodiment, it is easily possible to adjust the corresponding diaphragm close to the focal point between the maximum opened position and the maximum closed position. The corresponding diaphragm close to the focal point is therefore adjusted between the maximum opened position and the maximum closed position while the first actuating pin runs through the second section of the guide rail.

As a minimum, only one single one of the diaphragms close to the focal point is adjusted via the one first drive. It is also possible for a number of the diaphragms close to the focal point to be adjusted via the at least one first drive. If, by way of example, as is generally usual, four diaphragms close to the focal point exist, which limit a rectangular diaphragm opening close to the focal point, two first drives may be available, for instance, wherein each of the two first drives adjusts two opposing diaphragms mutually.

As a minimum only one single filter plate is available, which can be moved over the large diaphragm opening close to the focal point via the one first drive. If a number of first drives is available, a separate filter plate can be moved over the large diaphragm opening close to the focal point via a respective first drive in each case. With two first drives, one filter plate or two filter plates (individually or together) can if necessary be moved over the large diaphragm opening close to the focal point. With four first drives, up to four filter plates can be moved over the large diaphragm opening close to the focal point.

The intermediate element is preferably embodied as a ring, which can be rotated about an axis running orthogonally to the baseplate via the one first drive. In this case, the axis contains the center of the large diaphragm opening close to the focal point (and also the small diaphragm opening close to the focal point). In particular in the case of the embodiment of the intermediate element as a ring, it is also particularly easily possible to adjust two opposing diaphragms via one and the same intermediate element.

The first actuating pin is preferably forcibly actuated via the guide rail. As a result, it is not necessary to provide return springs or the like, which apply a reset force to the diaphragms close to the focal point. Accordingly, it is also not necessary to overcome such a reset force via the one first drive. The one first drive can therefore be dimensioned relatively small.

The intermediate element preferably also has a second actuating pin which penetrates through the baseplate through a cutout in the baseplate. However, the second actuating pin does not act on another diaphragm close to the focal point and also not on a diaphragm at a distance from the focal point, but instead on the filter plate. The effect on the filter plate is such that the filter plate is then always moved out of the large diaphragm opening close to the focal point if the first actuating pin is located in the second section of the guide rail and is then always moved over the large diaphragm opening close to the focal point if the first actuating pin within the first section of the guide rail is located at a predetermined point which is at a distance from the second section of the guide rail. The movement of the filter plate over the large diaphragm opening close to the focal point or out therefrom is therefore carried out while the first actuating pin runs through the first section of the guide rail. The predetermined point can be in particular the end of the first section of the guide rail which is at a distance from the second section of the guide rail.

The filter plate preferably has a bent or kinked section so that the second actuating pin can be moved under the filter plate while the first actuating pin in the first section of the guide rail is moving toward the second section of the guide rail. As a result, the movement of the corresponding diaphragm close to the focal point and the movement of the filter plate can be matched more easily to one another.

The collimator arrangement preferably has a return spring, via which a resetting force is exerted onto the filter plate upon movement over the large diaphragm opening close to the focal point. As a result, it is possible in particular that forced guidance of the filter plate by the second actuating pin is not required. The wording “upon movement over the large diaphragm opening close to the focal point” in conjunction with the wording “a resetting force is exerted” is intended to clarify the direction in which the resetting force is acting. Upon movement over the large diaphragm opening close to the focal point, the resetting force is therefore directed against the movement of the filter plate, upon movement out of the large diaphragm opening close to the focal point, the resetting force is directed with the movement of the filter plate.

The collimator arrangement preferably has a stop, against which the filter plate is then pressed via the return spring if it is not deflected in the direction of the large diaphragm opening close to the focal point via the second actuating pin. As a result, if the filter plate is moved out of the large diaphragm opening close to the focal point, a defined rest position of the filter plate is achieved.

The movement of the filter plate is preferably a pivot movement about an axis, which runs orthogonally to a plane defined by the large diaphragm opening close to the focal point. A pivot movement about an axis of this type can be realized more reliably than a linear movement in a plane which runs parallel to a plane defined by the large diaphragm opening close to the focal point. In particular, it is not possible to tilt the filter plate.

According to FIG. 1, an x-ray arrangement has an x-ray source 1. During operation the x-ray source 1 emits x-ray radiation which is detected by an x-ray detector 2. The x-ray radiation irradiates an examination object 3 (for instance a human). A collimator arrangement 4 is arranged between the x-ray source 1 and the examination object 3. The collimator arrangement 4 has a diaphragm arrangement 5 close to the focal point and a diaphragm arrangement 6 at a distance from the focal point. The diaphragm arrangement 5 close to the focal point is arranged closer to the x-ray source 1 than the diaphragm arrangement 6 at a distance from the focal point.

Figure 2:
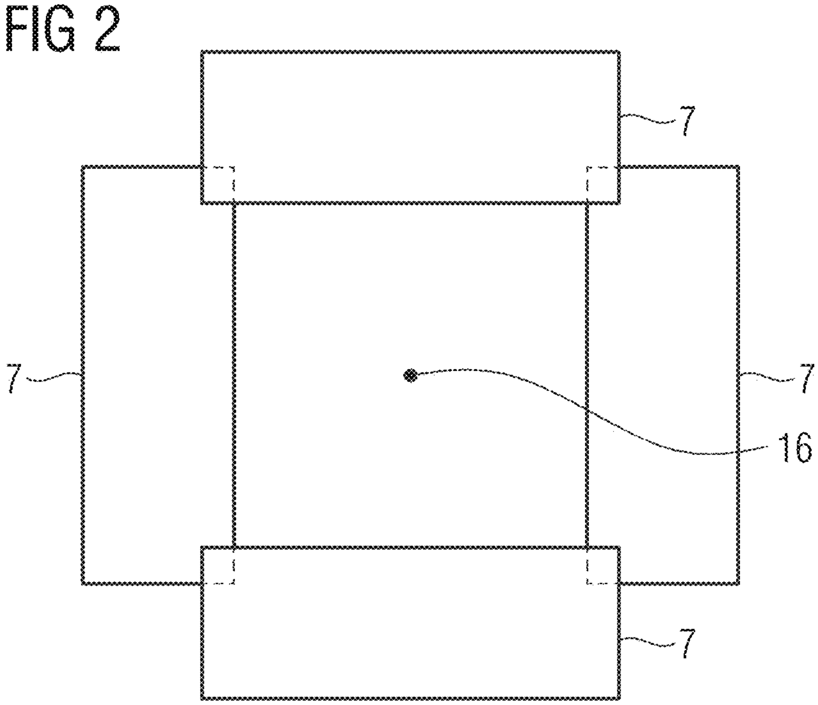
FIG. 2 shows a schematic representation of a diaphragm arrangement close to the focal point in a maximum opened position according to one or more example embodiments.
Figure 3:
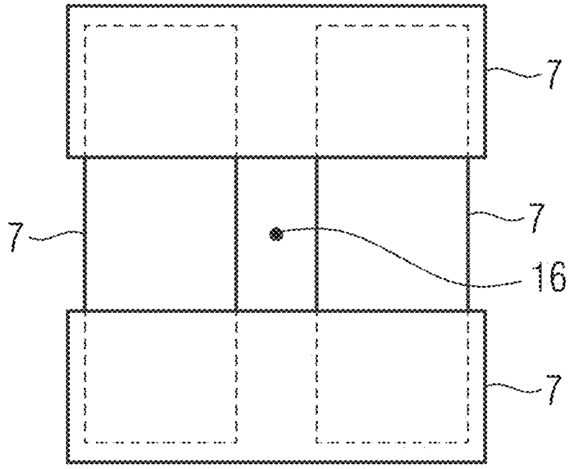
FIG. 3 shows a schematic representation of the diaphragm arrangement close to the focal point in FIG. 2 in a maximum closed position according to one or more example embodiments.

The diaphragm arrangement 5 close to the focal point has a number of diaphragms 7 close to the focal point, for instance according to the representation in FIGS. 2 and 3, four diaphragms 7 close to the focal point. In accordance with FIG. 1, the diaphragms 7 close to the focal point can be adjusted between a maximum opened position (FIG. 2) and a maximum closed position (FIG. 3) via first drives 8. In the maximum opened position, the diaphragms 7 close to the focal point form a large diaphragm opening (FIG. 2) close to the focal point and in the maximum closed position they form a small diaphragm opening (FIG. 3) close to the focal point. Often the adjustment of opposing diaphragms 7 close to the focal point is effected in pairs by a single first drive 8 in each case. In FIG. 1 the diaphragm arrangement 5 close to the focal point is shown in the maximum closed position.

The diaphragm arrangement 6 at a distance from the focal point is generally set up completely analogously to the diaphragm arrangement 5 close to the focal point. It has a number of diaphragms 9 at a distance from the focal point. The diaphragms 9 at a distance from the focal point are adjusted via second drives 10 in accordance with FIG. 1. The second drives 10 are drives which differ from the first drives 8. The diaphragm arrangement 6 at a distance from the focal point is shown in the maximum opened position in FIG. 1.

According to FIG. 1, a filter plate 11 is also available. The filter plate 11 generally consists of copper. It typically has a thickness of 0.6 mm or 2.1 mm. The filter plate 11 can be moved over the large diaphragm opening close to the focal point. The wording "can be moved over the large diaphragm opening close to the focal point" means that in this case the filter plate 11 completely covers the large diaphragm opening close to the focal point. Therefore, originating from the x-ray source 1, only x-ray radiation which has previously penetrated the filter plate 11 strikes the x-ray detector 2. This applies irrespective of whether the filter plate 11 is arranged closer to the x-ray source 1 than the diaphragm opening 5 close to the focal point or further away from the x-ray source 1 than the diaphragm arrangement 5 close to the focal point (wherein the latter is shown in FIG. 1 and is also preferred).

The filter plate 11 is moved via one of the first drives 8. The diaphragm 7 close to the focal point which is adjusted by this first drive 8 is located in the maximum opened position of the diaphragm 7 close to the focal point when the filter plate 11 is moved.

Figure 4:
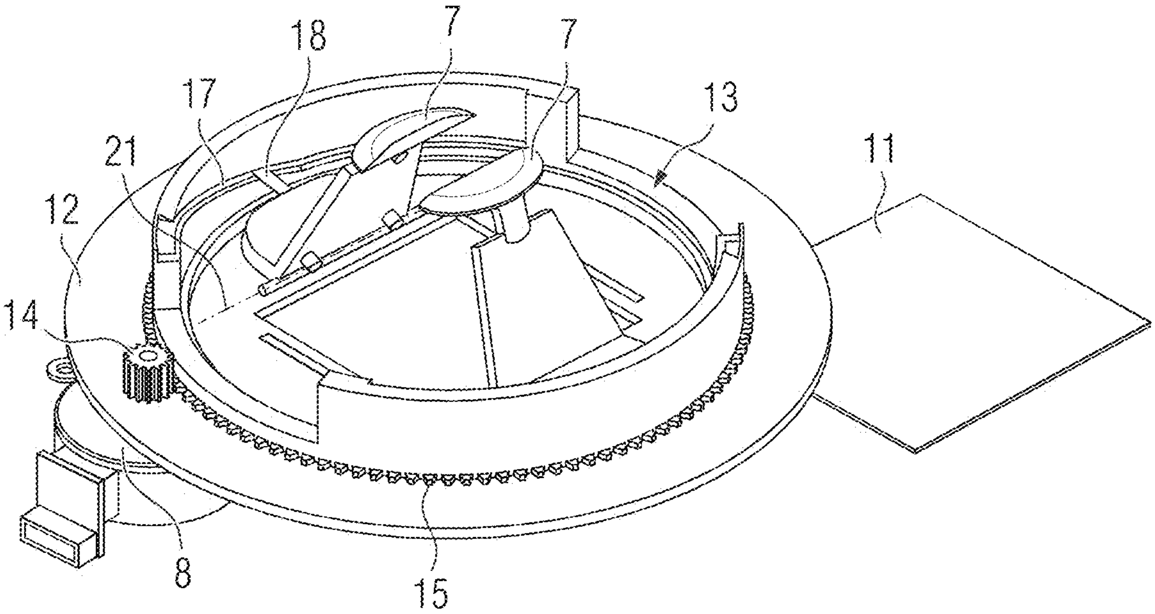
FIG. 4 shows a schematic representation of a perspective view of a collimator arrangement obliquely from above according to one or more example embodiments.
Figure 5:
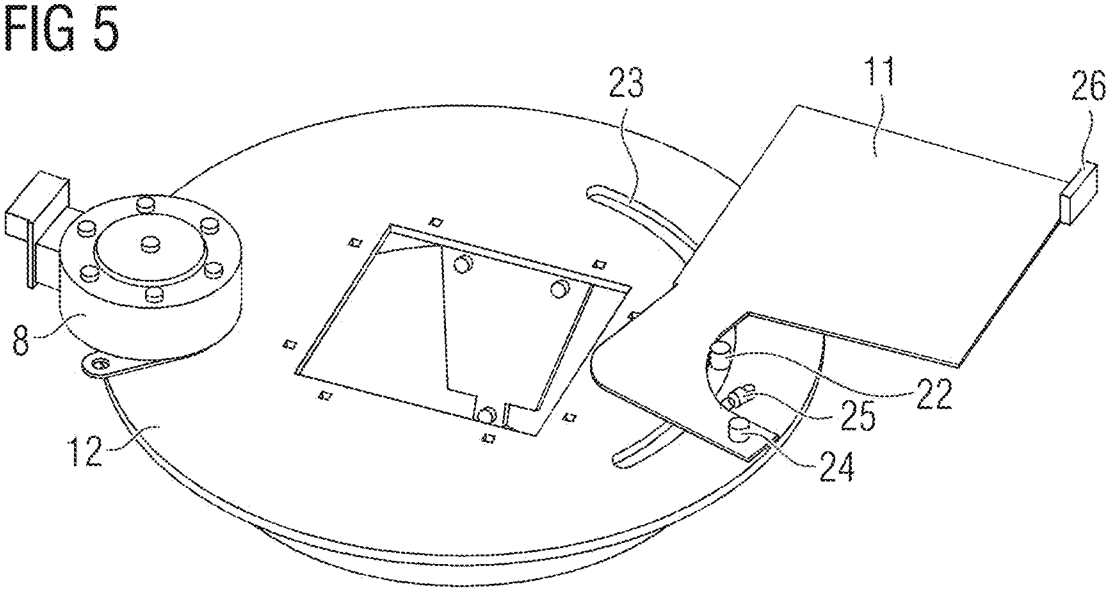
FIG. 5 shows a schematic representation of a perspective view of the collimator arrangement in FIG. 4 obliquely from below according to one or more example embodiments.

FIGS. 4 and 5 show one possible specific embodiment of the collimator arrangement 4. According to FIGS. 4 and 5, the collimator arrangement 4 has a baseplate 12. The baseplate 12 extends parallel to a plane defined by the large diaphragm opening close to the focal point. The diaphragms 7 close to the focal point are arranged on a first side of the baseplate 12. Only two of the diaphragms 7 which are close to the focal point and lie opposite one another are shown in FIGS. 4 and 5. The side of the baseplate 12, on which the diaphragms 7 close to the focal point are arranged, is referred to below according to the typical arrangement (x-ray source 1 above, x-ray detector 2 below) as the topside of the baseplate 12.

The first drive 8, via which the filter plate 11 is moved, is arranged on the baseplate 12. The other first drives 8 are generally likewise arranged on the baseplate 12. For the further embodiments of the present invention, however, they are of less significance and are therefore not shown in FIGS. 4 and 5. The subsequent embodiments always relate to the first drive 8, via which the filter plate 11 is also moved.

In accordance with FIG. 4, the first drive 8 moves an intermediate element 13, which is likewise arranged on the topside of the baseplate 12. For instance, the first drive 8 can act on a toothing 15 of the intermediate element 13 by way of a pinion 14. According to the representation in FIGS. 4 and 5, it is currently preferable that the intermediate element 13 be embodied as a ring. In this case, the ring can be rotated about an axis 16 which runs orthogonally to the baseplate 12 via the first drive 8. In accordance with FIG. 2, the axis 16 contains the center of the large diaphragm opening close to the focal point and generally according to the representation in FIG. 3 also the center of the small diaphragm opening close to the focal point.

According to FIG. 4, a guide rail 17 is arranged on the intermediate element 13. An actuating pin 18 engages into the guide rail 17 and is arranged on one of the diaphragms 7 close to the focal point. The actuating pin 18 is referred to below as first actuating pin 18, in order to be able to differentiate it linguistically from a second actuating pin which is detailed again later.

Figure 6:
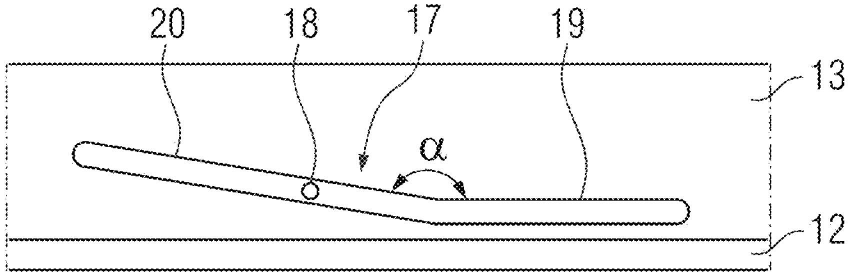
FIG. 6 shows a schematic representation of an inner wall of an intermediate element in an unwound representation according to one or more example embodiments.

The inner wall of the intermediate element 13 including the guide rail 17 is shown in FIG. 6 in an unwound representation. According to FIG. 6, also identifiable from the approach in FIG. 4, the guide rail 17 has a first section 19 and a second section 20. The first section 19 runs parallel to the baseplate 12. The second section 20 adjoins the first section 19, forms an obtuse angle $\alpha$ with the first section 19, however. In most cases the angle $\alpha$ is in the range between 150° and 170°.

If the intermediate element 13 is moved via the first drive 8 (currently rotated) while the first actuating pin 18 is located in the second section 20, a height position of the first actuating pin 18 changes relative to the baseplate 12 as a result. As a result, the corresponding diaphragm 7 close to the focal point is moved further in the direction of the maximum closed position, the further the first actuating pin 18 is lifted relative to the baseplate 12. Specifically, the corresponding diaphragm 7 close to the focal point is in the maximum closed position if the first actuating pin 18 is located within the second section 20 and is distanced as far as possible from the first section 19. If by contrast the first actuating pin 18 is moved closer to the baseplate 12, the corresponding diaphragm 7 close to the focal point is moved even further in the direction of the maximum opened position, the further the first actuating pin 18 is moved toward the baseplate 12. If the first actuating pin 18 reaches the first section 19, the corresponding diaphragm 7 close to the focal point is in the maximum opened position. In order to move the diaphragm 7 close to the focal point, the diaphragm 7 close to the focal point can be pivotable about a pivot axis 21, for instance.

If the intermediate element 13 is moved (currently rotated) via the first drive 8 while the first actuating pin 18 is located in the first section 19, on account of the course of the first section 19 parallel to the baseplate 12, the height position of the first actuating pin 18 does not change relative to the baseplate 12. Accordingly, the corresponding diaphragm 7 close to the focal point is in the maximum opened position. This applies independently of the location within the first section 19 at which the first actuating pin 18 is currently located.

The arrangement of the guide rail 17 and the first actuating pin 18 can also be inverted. It is therefore likewise possible, conversely to the embodiment shown in FIGS. 4 and 5, for the first actuating pin 18 to be arranged on the intermediate element 13 and for the actuating pin 18 to engage into a guide rail 17 arranged on the corresponding diaphragm 7 close to the focal point. The functional principle does not change as a result.

According to FIG. 6, the movement of the first actuating pin 18 is limited both upward (=away from the baseplate 12) and also downward (toward the baseplate 12) by the guide rail 17 at each location of the guide rail 17 at which the first actuating pin 18 is located at that moment. The first actuating pin 18 is therefore forcibly guided via the guide rail 17. Alternatively, it would be possible to guide the first actuating pin 18 only on one side via an edge of the guide rail 17 and to apply a spring force to the corresponding diaphragm 7 close to the focal point in the direction of this edge. This embodiment is not preferred, however.

As already mentioned, in addition to the first actuating pin 18, the intermediate element 13 has a further actuating pin 22, subsequently referred to as the second actuating pin 22. In accordance with FIG. 5, the second actuating pin 22 projects through the baseplate 12 through a cutout 23 in the baseplate 12. The second actuating pin 22 acts on the filter plate 11, which, in accordance with FIG. 5, is arranged on the underside of the baseplate 12. Specifically in the representation in FIG. 5, the filter plate 11 can be pivoted about an axis 24 via the second actuating pin 22. The movement of the filter plate 11 is therefore a pivot movement about the axis 24. The axis 24 runs orthogonally to a plane defined by the large diaphragm opening close to the focal point. In the case of the given arrangement of the filter plate 11 on the baseplate 12, the axis 24 also runs orthogonally to the baseplate 12.

FIG. 5 shows a position (rotational position), in which the second actuating pin 22 just begins to act on the filter plate 11, provided the intermediate element 13 is rotated in the clockwise direction in the representation in FIG. 5 or just stops acting on the filter plate 11, provided the intermediate element 13 is rotated counter to the clockwise direction. The filter plate 11 is therefore in a rest position in FIG. 5, in which it is not, also not partially, moved over the large diaphragm opening close to the focal point. The further the intermediate element 13 is rotated in the clockwise direction however, starting from the position shown in FIG. 5, the further therefore the filter plate 11 is pivoted about the axis 24 from the position shown in FIG. 5. At the latest when the second actuating pin 22 reaches the lower end of the cutout 23 in FIG. 5, the filter plate 11 is moved over the (entire) large diaphragm opening close to the focal point.

During the entire movement process of the filter plate 11 (and the positions or rotational positions of the intermediate element 13 corresponding herewith), the first actuating pin 18 is located in the first section 19 of the guide rail 17. Conversely, the filter plate 11 is then always (completely) moved out of the large diaphragm opening close to the focal point if the first actuating pin 18 is located in the second section 20 of the guide rail 17. Furthermore, for the same reason the filter plate 11 is moved (completely) over the large diaphragm opening close to the focal point if the first actuating pin 18 within the first section 19 is located at a predetermined point which is distanced from the second section 20. Generally, the predetermined point is the end of the first section 19 which is at a distance from the second section 20. The latter is of less significance, however.

According to the representation in FIG. 5, a return spring 25 is preferably available. A resetting force is exerted onto the filter plate 11 via the return spring 25 upon movement over the large diaphragm opening close to the focal point. The return spring 25 shown in FIG. 5 is therefore a tension spring. In another arrangement of the return spring 25, one embodiment is possible also as a compression spring or coil spring. If the filter plate 11 is not deflected in the direction of the large diaphragm opening close to the focal point via the second actuating pin 22, it is pressed against a stop 26 via the return spring 25.

Figure 7:
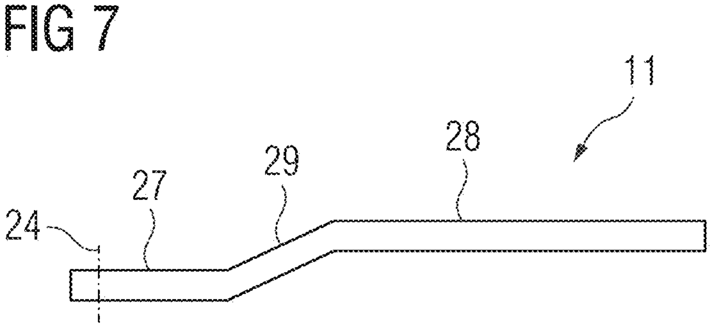
FIG. 7 shows a schematic representation of a side view of a filter plate according to one or more example embodiments.

In accordance with FIG. 7, the filter plate 11 has a starting section 27, an end section 28 and an intermediate section 29 between the starting section 27 and the end section 28. The end section 28 is that section of the filter plate 11 which is moved over the large diaphragm opening close to the focal point. The starting section 27 is that section of the filter plate 11 in which the axis 24 is currently located. The intermediate section 29 is bent, or as shown in FIG. 7, kinked. On account of the intermediate section 29, the end section 28 is at a distance from the baseplate 12. As a result, the second actuating pin 22 can be moved below the filter plate 11 while the actuating pin 18 in the first section 19 of the guide rail 17 is moving toward the second section 20 of the guide rail 17. This embodiment facilitates the required decoupling of the movement curve of the diaphragms 7 close to the focal point on the one hand and the movement curve of the filter plate 11 on the other hand.

One or more example embodiments has a number of advantages. In particular, it is easily possible to integrate the filter plate 11 into the collimator arrangement 4 and to be able to move the filter plate 11 automatically into the beam path from the x-ray source 1 to the x-ray detector 2. The inventive collimator arrangement 4 can be built to be compact. On account of the automated method of the filter plate 11, even the calibration process as such can be automated.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, and/or software, a combination thereof. For example, hardware devices may be implemented using processing circuitry such as, but not limited to, a processor, Central Processing Unit (CPU), a Graphics Processing Unit (GPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Units and/or devices according to one or more example embodiments may also include one or more storage devices.

The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A collimator arrangement for an x-ray tube, the collimator arrangement comprising:

a diaphragm arrangement proximal to a focal point, the diaphragm arrangement proximal to the focal point including a plurality of diaphragms proximal to the focal point, the plurality of diaphragms proximal to the focal point are adjustable between a maximum opened position and a maximum closed position via a number of first drives such that the plurality of diaphragms proximal to the focal point form a large diaphragm opening proximal to the focal point in the maximum opened position and a small diaphragm opening proximal to the focal point in the maximum closed position; and a diaphragm arrangement at a distance from the focal point, the diaphragm arrangement at a distance from the focal point including a plurality of diaphragms at a distance from the focal point, the plurality of diaphragms at a distance from the focal point are adjustable between a maximum opened position and a maximum closed position via a number of second drives such that the plurality of diaphragms at a distance from the focal point form a large diaphragm opening at a distance from the focal point in the maximum opened position and a small diaphragm opening at a distance from the focal position in the maximum closed position, wherein the first drives and the second drives are different, and a filter plate is movable over the large diaphragm opening proximal to the focal point via one of the first drives in the maximum opened position of the plurality of diaphragms proximal to the focal point.

2. The collimator arrangement of claim 1, wherein the plurality of diaphragms proximal to the focal point are on a first side of a baseplate, the baseplate extends parallel to a plane defined by the large diaphragm opening proximal to the focal point, one first drive moves an intermediate element on the first side of the baseplate, a guide rail is on the intermediate element, a first actuating pin on one of the plurality of diaphragms proximal to the focal point engages into the intermediate element or a first actuating pin is on the intermediate element and engages into a guide rail on one of the plurality of diaphragms proximal to the focal point, the guide rail has a first section parallel to the baseplate and a second section adjoining the first section and running at an obtuse angle with respect to the first section, and the one of the plurality of diaphragms proximal to the focal point is always in the maximum opened position if the first actuating pin is in the first section of the guide rail and is always in the maximum closed position if the first actuating pin is within the second section of the guide rail and is at a maximum distance from the first section of the guide rail.

3. The collimator arrangement of claim 2, wherein the intermediate element is a ring, rotatable about an axis orthogonal to the baseplate via the one first drive, and the axis contains a center of the large diaphragm opening proximal to the focal point.

4. The collimator arrangement of claim 2, wherein the first actuating pin is forcibly guidable via the guide rail.

5. The collimator arrangement of claim 2, wherein the intermediate element includes a second actuating pin penetrating the baseplate through a cutout in the baseplate and acts on the filter plate such that the filter plate is moved out of the large diaphragm opening proximal to the focal point when the first actuating pin is in the second section of the guide rail and is moved over the large diaphragm opening proximal to the focal point when the first actuating pin is within the first section of the guide rail at a predetermined location which is at a distance from the second section of the guide rail.

6. The collimator arrangement of claim 5, wherein the filter plate has a bent or kinked section such that the second actuating pin is movable below the filter plate while the first actuating pin in the first section of the guide rail is moving toward the second section of the guide rail.

7. The collimator arrangement of claim 1, wherein the collimator arrangement includes a return spring configured to exert a resetting force onto the filter plate upon movement over the large diaphragm opening proximal to the focal point.

8. The collimator arrangement of claim 7, wherein the collimator arrangement includes a stop, the filter plate being pressed against the stop via the return spring if the return spring is not deflected in a direction of the large diaphragm opening proximal to the focal point via the second actuating pin.

9. The collimator arrangement of claim 1, wherein the filter plate is pivotable about an axis orthogonal to a plane defined by the large diaphragm opening proximal to the focal point.

10. The collimator arrangement of claim 3, wherein the first actuating pin is forcibly guidable via the guide rail.

11. The collimator arrangement of claim 3, wherein the intermediate element includes a second actuating pin penetrating the baseplate through a cutout in the baseplate and acts on the filter plate such that the filter plate is moved out of the large diaphragm opening proximal to the focal point when the first actuating pin is in the second section of the guide rail and is moved over the large diaphragm opening proximal to the focal point when the first actuating pin is within the first section of the guide rail at a predetermined location which is at a distance from the second section of the guide rail.

12. The collimator arrangement of claim 4, wherein the intermediate element includes a second actuating pin penetrating the baseplate through a cutout in the baseplate and acts on the filter plate such that the filter plate is moved out of the large diaphragm opening proximal to the focal point when the first actuating pin is in the second section of the guide rail and is moved over the large diaphragm opening proximal to the focal point when the first actuating pin is within the first section of the guide rail at a predetermined location which is at a distance from the second section of the guide rail.

13. The collimator arrangement of claim 12, wherein the collimator arrangement includes a return spring configured to exert a resetting force onto the filter plate upon movement over the large diaphragm opening proximal to the focal point.

14. The collimator arrangement of claim 13, wherein the filter plate is pivotable about an axis orthogonal to a plane defined by the large diaphragm opening proximal to the focal point.

* * * * *